(12) United States Patent
Zhou et al.

(10) Patent No.: US 9,383,202 B2
(45) Date of Patent: Jul. 5, 2016

(54) BAROMETRIC PRESSURE SENSOR BASED ORIENTATION MEASUREMENT

(71) Applicant: Google Inc., Mountain View, CA (US)

(72) Inventors: Shuchang Zhou, Beijing (CN); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 588 days.

(21) Appl. No.: 13/796,983

(22) Filed: Mar. 12, 2013

(65) Prior Publication Data

US 2015/0153171 A1    Jun. 4, 2015

(51) Int. Cl.
*G01L 7/00*     (2006.01)
*G01C 9/00*     (2006.01)
*G01C 5/06*     (2006.01)

(52) U.S. Cl.
CPC .......... *G01C 5/06* (2013.01); *G06F 2200/1637* (2013.01)

(58) Field of Classification Search
CPC .......................... G01C 5/06; G06F 2200/1637
USPC ................................................. 702/138, 150
See application file for complete search history.

(56) References Cited

U.S. PATENT DOCUMENTS

| | | | | |
|---|---|---|---|---|
| 5,295,085 | A * | 3/1994 | Hoffacker ........................ | 73/384 |
| 2010/0049469 | A1* | 2/2010 | Wirola et al. .................. | 702/150 |
| 2010/0052896 | A1* | 3/2010 | Goodman ................ | 340/539.11 |
| 2011/0025562 | A1* | 2/2011 | Hol et al. ....................... | 342/387 |
| 2011/0241377 | A1* | 10/2011 | Rogers et al. .............. | 296/180.3 |
| 2012/0013475 | A1* | 1/2012 | Farley et al. .................. | 340/665 |
| 2012/0065925 | A1* | 3/2012 | Chen et al. .................... | 702/138 |
| 2013/0054180 | A1* | 2/2013 | Barfield ........................ | 702/138 |
| 2013/0205306 | A1* | 8/2013 | Kelly ...................... | G06F 9/542 719/318 |
| 2014/0191964 | A1* | 7/2014 | McDonald et al. ........... | 345/158 |
| 2015/0226764 | A1* | 8/2015 | Ten Kate ....................... | 702/141 |

OTHER PUBLICATIONS

"Droidcon 2012: Indoor orientation in underground based on barometer," Roland Wagner, Beuth Hochschule für Technik Berlin, Apr. 9, 2012, <http://www.slideshare.net/droidcon/indoor-orientationinundergroundbased-onbarometer>.
"Indoor and underground orientation and navigation by using the barometer sensor", Roland Wagner, Beuth Hochschule für Technik Berlin Presentation Transcript, Droidcon 2012, Berlin, Urania, Mar. 14, 2012, <http://www.slideshare.net/droidcon/indoor-orientationinundergroundbased-onbarometer>.
"Droidcon 2012: Indoor orientation in underground based on barometer," Roland Wagner, Beuth Hochschule für Technik Berlin, Presentation Transcript, <http://www.slideshare.net/droidcon/indoor-orientationinundergroundbased-onbarometer#text-version>.

* cited by examiner

*Primary Examiner* — Gregory J Toatley
*Assistant Examiner* — Eman Alkafawi
(74) *Attorney, Agent, or Firm* — Lerner, David, Littenberg, Krumholz & Mentlik, LLP

(57) ABSTRACT

Disclosed here are methods and systems that relate to determining an orientation of an object. The orientation of the object may be represented by an Euler angle which identifies a rotation of the object from a reference frame. The methods and systems may rely on readings collected from two or more barometric pressure sensors to estimate an altitude difference between the pressure sensors. The methods and systems may calculate the Euler angle based on the altitude difference.

19 Claims, 15 Drawing Sheets

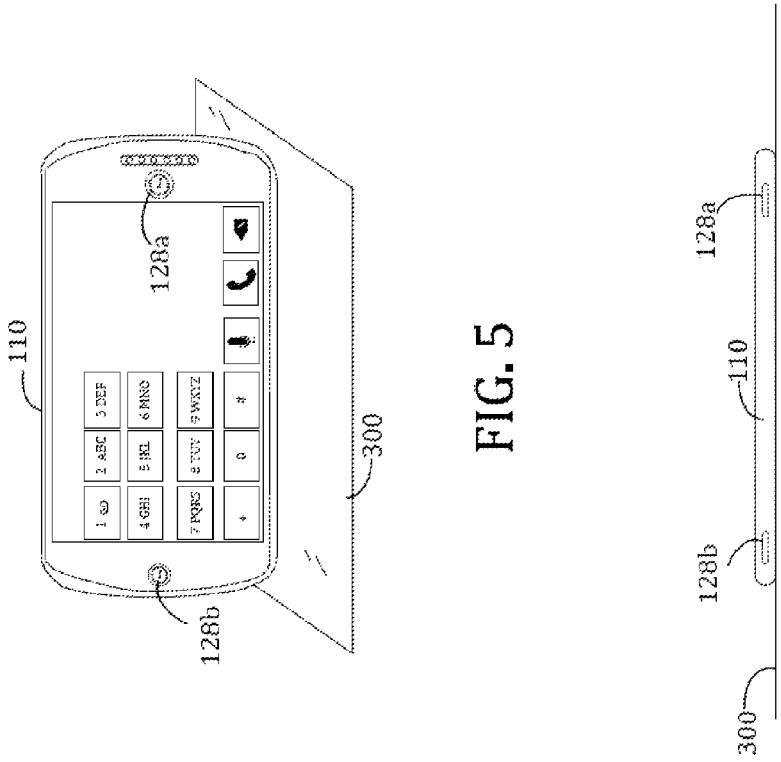
FIG. 5
FIG. 6
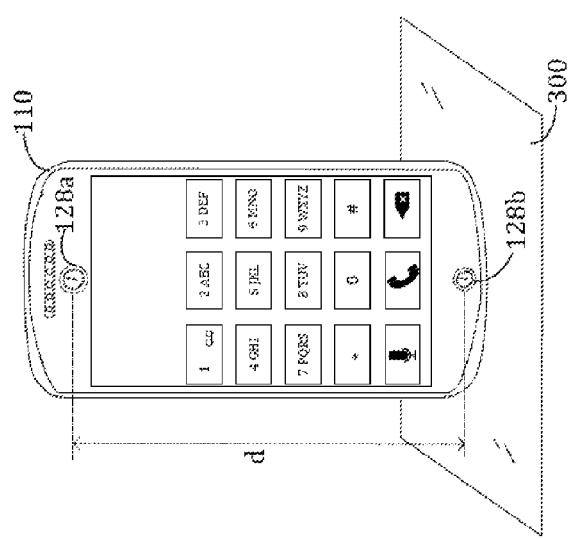
FIG. 4

BAROMETRIC PRESSURE SENSOR BASED ORIENTATION MEASUREMENT

BACKGROUND

Existing technologies for determining a device's orientation may generally have a low tolerance for environment noise and may sometimes suffer from a lack of precision. Further, their cost and complexity place constraints on the environments in which they are practical for use.

Some technologies for determining an orientation of a device include using a compass, accelerometer and gyroscope, all of which have various shortcomings. For instance, a magnetic compass may be easily interfered by ferromagnetic materials or electromagnetic waves. An accelerometer may be error-prone due to forces exerted on the device. When the device is a vehicle, accelerometer readings may deviate due to acceleration or deceleration of the vehicle, which, in turn, may cause difficulties in determining the direction of the vehicle.

A gyroscope may indicate an angular velocity of the device. Once an initial orientation of the device is known, the gyroscope may help constantly compute an updated orientation of the platform. However, the gyroscope (and the accelerometer) may suffer from integration drift. Small errors in the measurement of acceleration and angular velocity may be integrated into progressively larger errors in orientation. These errors may accumulate over time, which may require periodic corrections.

BRIEF SUMMARY

This document describes technologies, methods, systems, devices, and other mechanisms for determining an orientation of a user device, such as a handheld mobile phone, PDA, and vehicle, etc.

One aspect of the disclosure provides a method for determining an orientation of a mobile device. The mobile device has two pressure sensors mounted therein. The method receives readings from the two pressure sensors. A processor determines an altitude difference between the two pressure sensors based on their readings. The processor compares the altitude difference to a threshold value. When the altitude difference is above the threshold value, the mobile device is in a first orientation. When the altitude difference is below the threshold value, the mobile device is in a second orientation. The first orientation may for example be a vertical position, whereas the second orientation may for example be a horizontal position. The two pressure sensors may be barometric pressure sensors.

Another aspect of the disclosure provides a method for determining an orientation of a mobile device. The mobile device has three pressure sensors mounted therein. The method receives readings from the three pressure sensors. A processor determines altitude differences among the three pressure sensors based on their readings. The processor calculates an Euler angle based on the altitude differences. The Euler angle represents a rotation of a frame of the mobile device from a reference frame. The processor determines the orientation of the mobile device using the Euler angle. The pressure sensors may be barometric pressure sensors.

In one aspect, the three pressure sensors may be mounted in the mobile device in a non-collinear manner. For instance, two of the pressure sensors may be mounted respectively on two axes of the frame of the mobile device. A remaining pressure sensor may be mounted at an origin of the frame of the mobile device.

Yet another aspect of the disclosure provides an apparatus having two pressure sensors and a processor. The processor is in communication with the pressure sensors. The processor is configured to receive readings from the two pressure sensors. The processor determines an altitude difference between the two pressure sensors based on their readings. The processor compares the altitude difference to a threshold value. When the altitude difference is above the threshold value, the apparatus is in a first orientation. When the altitude difference is below the threshold value, the apparatus is in a second orientation. The first orientation may for example be a vertical position, whereas the second orientation may for example be a horizontal position. The two pressure sensors may be barometric pressure sensors. The apparatus may be a mobile device.

A further aspect of the disclosure provides an apparatus having a housing with at least three pressure sensors coupled to the housing. The apparatus includes a processor in communication with each of the pressure sensors. The processor is configured to receive readings from each pressure sensor. The processor determines altitude differences among the pressure sensors based on the received readings. The processor calculates an Euler angle based on the altitude differences. The Euler angle represents a rotation of a frame of the apparatus from a reference frame. The processor determines the orientation of the housing of the apparatus using the Euler angle. The apparatus may be a mobile device or a vehicle.

The pressure sensors may be barometric pressure sensors. The pressure sensors may be arranged in a non-collinear manner. For instance, two of the pressure sensors may be mounted respectively on two axes of the frame of the apparatus, and a remaining pressure sensor may be mounted at an origin of the frame of the apparatus.

The foregoing summary is illustrative only and is not intended to be in any way limiting. In addition to the illustrative aspects, embodiments, and features, described above, further aspects, embodiments, and features will become apparent by reference to the drawings and the following detailed description.

BRIEF DESCRIPTION OF THE DRAWINGS

In the drawings, similar reference numbers and acronyms may identify elements or acts with the same or similar functionality for ease of understanding and convenience, unless context dictates otherwise.

FIG. 4 is a plan view of a mobile device with two pressure sensors in a standing vertical position.

FIG. 5 is a plan view of the mobile device of FIG. 4 in a standing horizontal position.

FIG. 6 is a side view of the mobile device of FIG. 4 in a lying position.

DETAILED DESCRIPTION

The following description provides specific details of aspects of the technologies detailed herein. The headings and subheadings provided herein are for convenience and ease of reading only.

1. OVERVIEW

The technologies described herein generally relate to determining an orientation of an object based at least in part on readings collected by two or more pressure sensors mounted in or on the object. The object may be a rigid body, a platform, or more particularly, a navigation system. Specific examples of the object may include a mobile device 110 as illustrated in FIG. 1, such as a mobile phone, PDA or netbook, and a vehicle 210 as illustrated in FIG. 2, among other possibilities.

One of the conventions in describing the orientation of an object in three-dimensional Euclidean space is Euler angles. Euler angles represent the spatial orientation of the object as a composition of angular rotations from a reference frame. The reference frame is a fixed coordinate system, which may be referred to as a world frame, world coordinate system, reference axis system, or global reference system. In some sense, the reference frame may represent the Earth.

Figure 1:
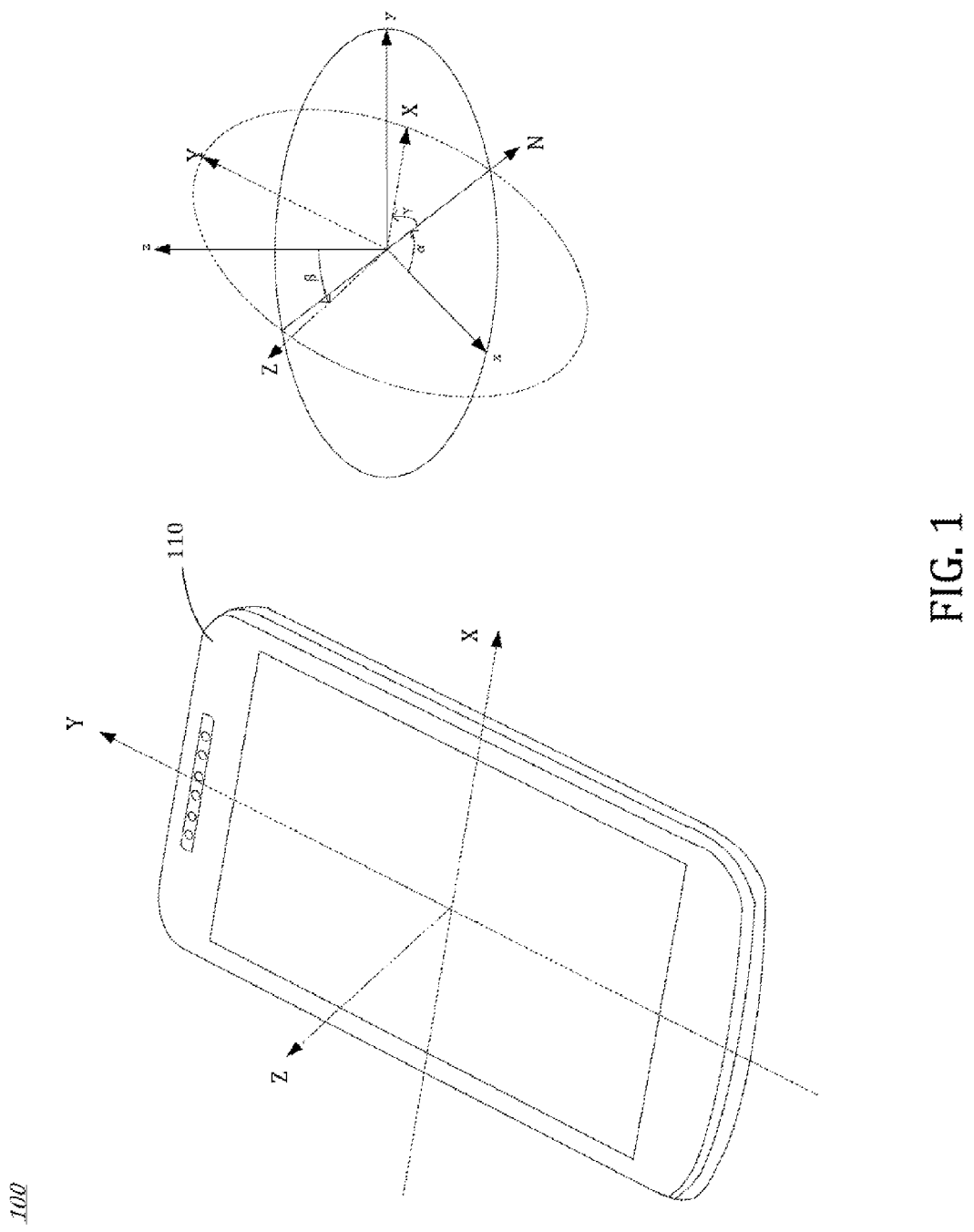
FIG. 1 is a schematic drawing of a prospective view of a mobile device relative to a reference frame.
Figure 2:
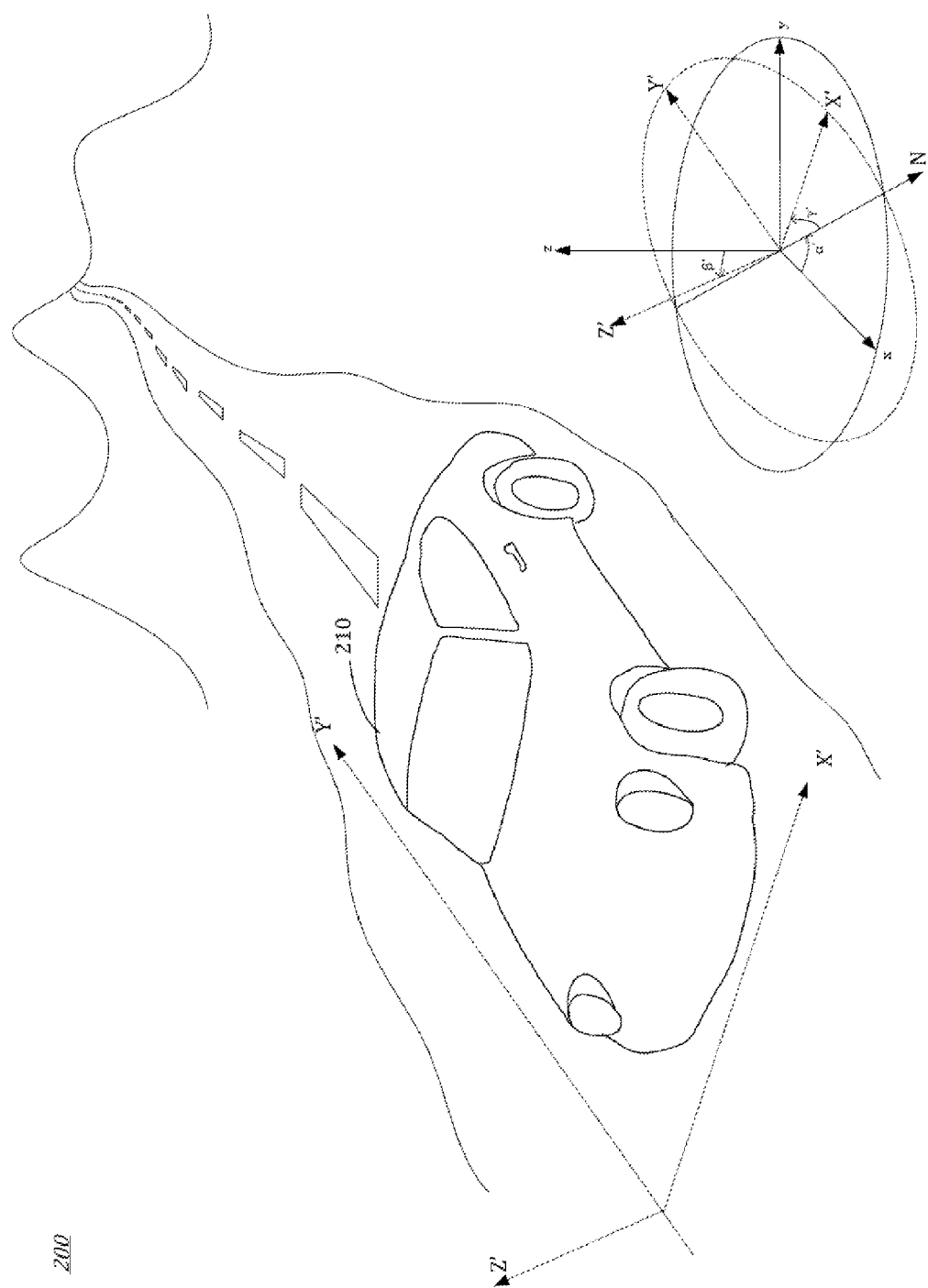
FIG. 2 is a schematic drawing of a prospective view of a vehicle relative to a reference frame.

By way of example, referring to FIG. 1, the reference frame may be denoted in lower case letters (x, y, z). The reference frame may include a z-axis that extends along the direction of Earth's gravity, and an x-y coordinate plane perpendicular to the direction of Earth's gravity.

The mobile device 110 may have a local frame of reference denoted in upper case letters (X, Y, Z), where an X-axis may extend in a lateral direction of the mobile device 110, a Y-axis may extend in a longitudinal direction of the mobile device 110, and a Z-axis may extend in a direction normal to the face of the mobile device 110.

The reference frame (x, y, z) and the local frame of reference (X, Y, Z) may overlap with each other when the mobile device 110 is at an initial position. As the mobile device 110 moves or rotates, the local frame of reference (X, Y, Z) may rotate relative to the reference frame (x, y, z), but the origin in each frame may remain coincident with each other.

Rotations of the local frame of reference (X, Y, Z) relative to the reference frame (x, y, z) are represented by the Euler angles $\alpha$, $\beta$, and $\gamma$ as indicated in FIG. 1. In particular, $\alpha$ is the angle between the x-axis and a line of nodes (N). The line of nodes is the interface of the x-y and the X-Y coordinate planes. $\beta$ is the angle between the z-axis and the Z-axis. $\gamma$ is the angle between the line of nodes (N) and the X-axis.

Similar notations may be found in FIG. 2, where the local frame of reference of the vehicle 210 is represented by upper case letters (X', Y', and Z'), and the Euler angles that indicate orientation of the vehicle 210 relative to the reference frame (x, y, z) are represented by $\alpha'$, $\beta'$, and $\gamma'$.

Unless otherwise stated, the disclosure uses the convention described in FIG. 1.

An object such as the mobile device 110 may move or rotate relative to the reference frame for many reasons. For instance, the mobile device 110 may be carried by a user, such as in a pocket or in a purse, worn on the user's belt or shoe, or held in a hand, among other possibilities. As such, the orientation of the mobile device 110 may constantly change as the user moves. Similarly, the vehicle 210 may constantly change its orientation relative to the reference frame (e.g., the Earth), as the vehicle accelerates up a hill, passes over the crest of the hill, and descends the hill, among other possibilities.

One aspect discussed herein relates to determining the orientation of an object based at least in part on readings collected from two or more pressure sensors mounted in the object. The technology determines an altitude difference between the pressure sensors, and determines an orientation based on the altitude difference. For instance, in the case of two pressure sensors, the altitude difference is compared to a threshold value, and the orientation of the object is determined based on the comparison. In the case of three pressure sensors, the technology may determine the altitude differences among the pressure sensors, and calculate one or more Euler angles based on the altitude differences.

For simplicity of illustration and explanation, the present disclosure primarily focusing on determining orientation of a mobile device is discussed below. However, the methods, processes, and techniques described herein are applicable to orientation determination in a vehicle.

2. EXAMPLE EMBODIMENTS OF A MOBILE DEVICE

By way of example and without limitation, the mobile device 110 may be a Personal Digital Assistant (PDA), a cell phone, a tablet computer, a smart phone, a laptop computer, a remote control, a music player, a media player device, a media recorder, a gaming device, a still camera, a video camera, a web cam, a car key fob, a Global Positioning System (GPS), or a wearable computing system (e.g., glasses, any type of near eye display unit, or a head-mounted display).

Figure 3:
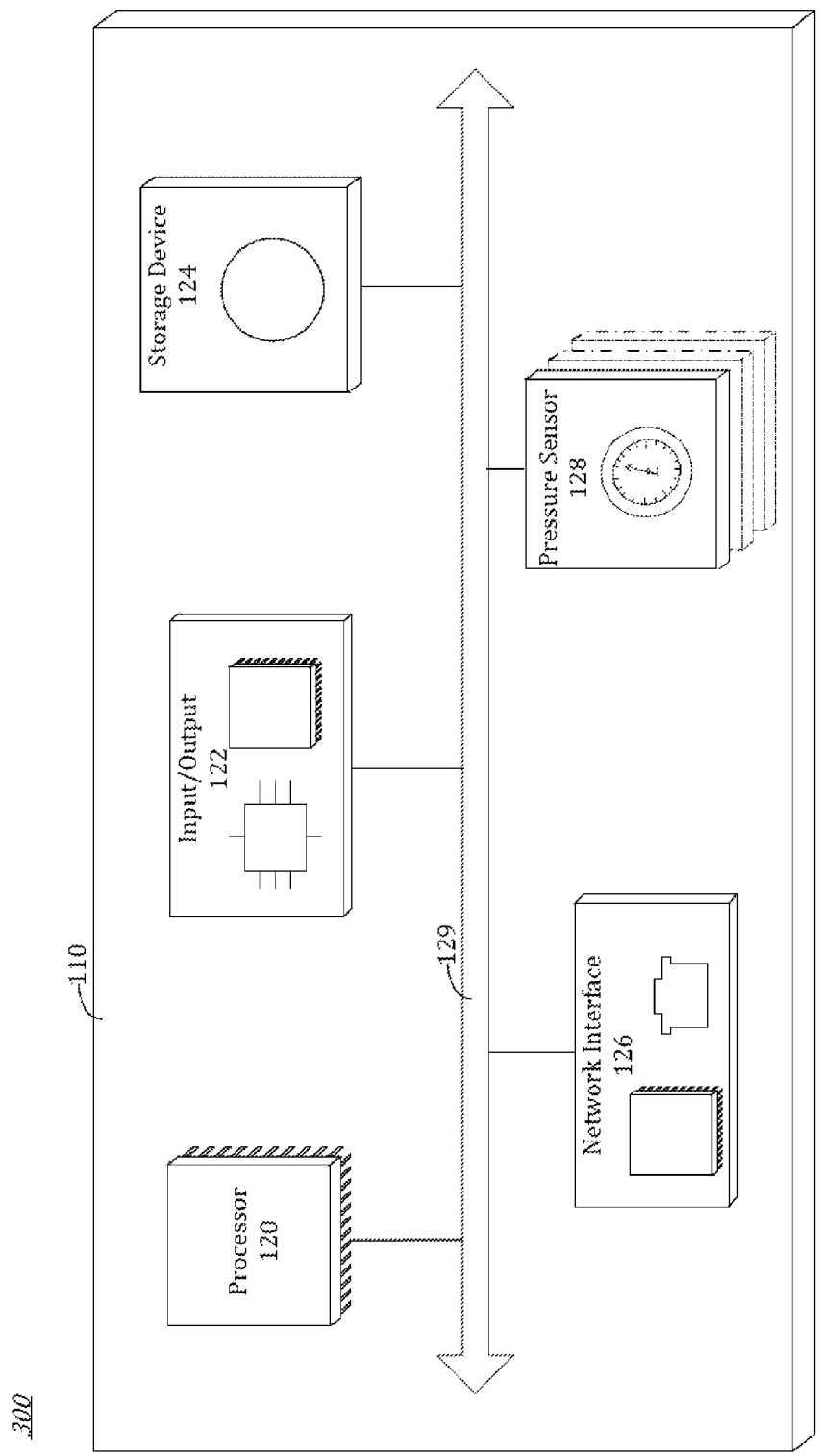
FIG. 3 is an example component diagram of a mobile device in accordance with aspects of the disclosure.

FIG. 3 is a simplified schematic diagram showing some of the components of the mobile device 110. The mobile device 110 may include one or more of the following components: a processor 120, an input/output device 122, a storage device 124, a network interface 126, and one or more pressure sensors 128. Components of the mobile device 110 may be communicatively coupled together in either a wired or wireless fashion. In one example as illustrated in FIG. 3, the components may be coupled together by a system bus 129. Detailed description of some example components of the mobile device is as follows.

2.1 Processor

The processor 120 controls the functions of the mobile device 10. For instance, the processor 120 may be configured to execute logic to determine an orientation of the mobile device 110. Example implementations with regard to the logic are described in connection with FIGS. 12-15. In addition to determining the device's orientation, the processor 120 may perform other functions, such as executing a geolocation related application after determining the orientation.

The processor 120 may be of any type including but not limited to a general purpose processor and a special purpose or dedicated processor, e.g., an application specific integrated circuit (ASIC), a digital signal processor (DSP), a graphical processing unit (GPU), a floating point processing unit (FPU), and the like. The processor 120 may refer to a single processor, or a collection of processors of the same type or various types, which may or may not operate in a parallel-processing mode.

The processor 120 may communicate with individual components of the mobile device 110. In one example, the processor 120 may act upon input signals provided by the input/output device 122. For instance, the processor 120 may rely on the user input to control when the mobile device 110 should determine its orientation. After determining the orientation, the processor 120 may output the result to the input/output device 122.

The processor 120 may execute computer-readable instructions or other instructions stored in the storage device 124. The processor 120 may read and write the data during execution of the computer-readable instructions.

2.2 Input/Output Device

The input/output device 122 may facilitate device interaction with a user, and may take various forms. The input/output device 122 may include a set of peripherals configured to provide input and output to and from a user of the mobile device 110.

By way of example, the input/out device 122 may include input components such as a keyboard, keypad, touch pad, point device, track ball, joystick, voice recognition device, touch-sensitive surface, microphone, digital camera, mouse, buttons, switch, scroll-wheel, scanner, GPS receiver, movement sensor, location sensor, infrared sensor, optical sensor, Radio Frequency identification (RFID) system, and wireless sensor, among others. The device 144 may provide a number of different types of input data, such as audio data from a microphone, text data from a keypad, video or image data from a camera, and gesture data from a touchpad, just to name a few.

The device 122 may also include output components such as a display, audio transducer, light indicator, tactile transducer, printer, light bulb, and vibration generator, among others.

The display may be any type of display including but not limited to a liquid crystal display (LCD), cathode ray tube display (CRT), light emitting diode display (LED), digital light processing display (DLP), plasma, optical see-through display, optical see-around display, video-see-through display, heads-up display, head-mounted display, flat-panel display, electroluminescent display (ELD), and organic LED (OLED) display, among other possibilities.

The audio transducer may take any form including but not limited to a speaker, headset, jack, earphone, and audio output port.

The device 122 may provide a number of different types of output data, such as visual output via a display, audio output via a speaker, and tactile output via a vibration generator, among others.

2.3 Storage Device

The storage device 124 provides storage for the mobile device 110 by using one or more non-transitory computer-readable media. One or more computer readable media may store volatile data, non-volatile data, or a combination thereof.

Some computer readable media may store data for a short period of time. Other computer readable media may store data persistently for a long period of time.

The computer-readable media may include primary storage, secondary storage, or a combination thereof. The primary storage may be simply referred to as memory, which is directly accessed by the processor 120. The secondary storage differs from the primary storage in that it is not directly accessible by the processor 120. Rather, data on the secondary storage needs to be transferred to the primary storage in order to be accessed by the processor 120.

Different types of the computer-readable media may include random-access memory (e.g., SRAM and DRAM), read-only memory (e.g., Mask ROM, PROM, EPROM, and EEPROM), non-volatile random-access memory (e.g. flash memory), a magnetic storage medium, an optical disc, a memory card, a Zip drive, a register memory, a processor cache, a solid state drive (SSD), and a redundant array of independent disks (RAID), among other possibilities.

The storage device 124 may store one or more computer-readable instructions, data, applications, processes, threads of applications, program modules and/or software, which are accessible or executable by the processor 120 to perform at least part of the herein-described methods and techniques.

By way of example, the computer-readable instructions in the storage device 124 may include logic that determines the orientation of the mobile device 110. One example of such logic is an orientation analyzer 130 (shown in FIG. 12). The orientation analyzer 130 may determine the orientation of the mobile device 110 by performing one or more of the following steps: (1) receiving readings from pressure sensors 128, (2) determining an altitude difference between the pressure sensors, and (3) determining an orientation based on the altitude difference.

Examples of data stored in the storage device 124 may include but not limited to variables, results, readings from one or more pressure sensors 128, and position information of the pressure sensors 128, among other possibilities.

2.4 Network Interface

The network interface 126 allows the mobile device 110 to communicate, using analog or digital modulation, with other devices or servers, on a network. The network interface 126 may include transmitters, receivers, and antennas, among others, to enable communication via the network. The network interface 126 may take the form of a wireless interface, a wireline interface, or a combination thereof, through which the mobile device 110 can connect to the network.

A wireless interface may include one or more wireless transmitters, receivers, transceivers, and the like, configurable to communicate to a wireless network using one or more wireless communication standards. Example wireless transceivers may include but not limited to a BLUETOOTH® transceiver, a Zigbee transceiver, a Wi-Fi transceiver, a WiMAX transceiver, and an infrared transceiver, among other possibilities. Example wireless communication standards include but not limited to BLUETOOTH®, Wi-Fi (802.11), 3G cellular communication standards (e.g., GSM, GPRS, CDMA, EV-DO, and/or HSPDA), and 4G cellular communication standards (e.g., LTE and WiMAX (802.16)), among other possibilities.

A wireline interface may include one or more wireline transmitters, receivers, transceivers, and the like, configurable to communicate via a twisted pair wire, a coaxial cable, a fiber-optic link, or a similar physical connection to a wireline network. Example wireline transceivers may include but not limited to an Ethernet transceiver and a Universal Serial Bus (USB) transceiver.

2.5 Pressure Sensor

The pressure sensor(s) 128 may measure pressure of gases or liquids. The pressure sensor 128 may generate a signal as a function of the pressure imposed. The pressure sensor 128 may sense pressure, altitude, flow, level or depth, among other possibilities.

The pressure sensor 128 may be a pressure transducer, pressure transmitter, pressure sender, pressure indicator, piezometer, or manometer, among other possibilities. The pressure sensor 128 may be of any type including but not limited to an absolute pressure sensor, a gauge pressure sensor, a vacuum pressure sensor, and a differential pressure sensor. In one example, the one or more pressure sensors 128 discussed herein may be barometric pressure sensors that measure fluctuations in the pressure exerted by the atmosphere.

The mobile device 110 may include two or more pressure sensors 128. FIGS. 4-7 illustrate an example mobile device 110 with two pressures sensors 128a-b embedded therein or otherwise attached thereto. In FIGS. 4-7, the pressure sensors 128a-b are illustrated in dashed lines to indicate that the pressure sensors 128a-b may be disposed within the casing of the mobile device 110, which is shown in solid lines. Alternatively, the pressure sensors 128a-b may be attached or mounted external to the casing of the mobile device 110.

Figure 7:
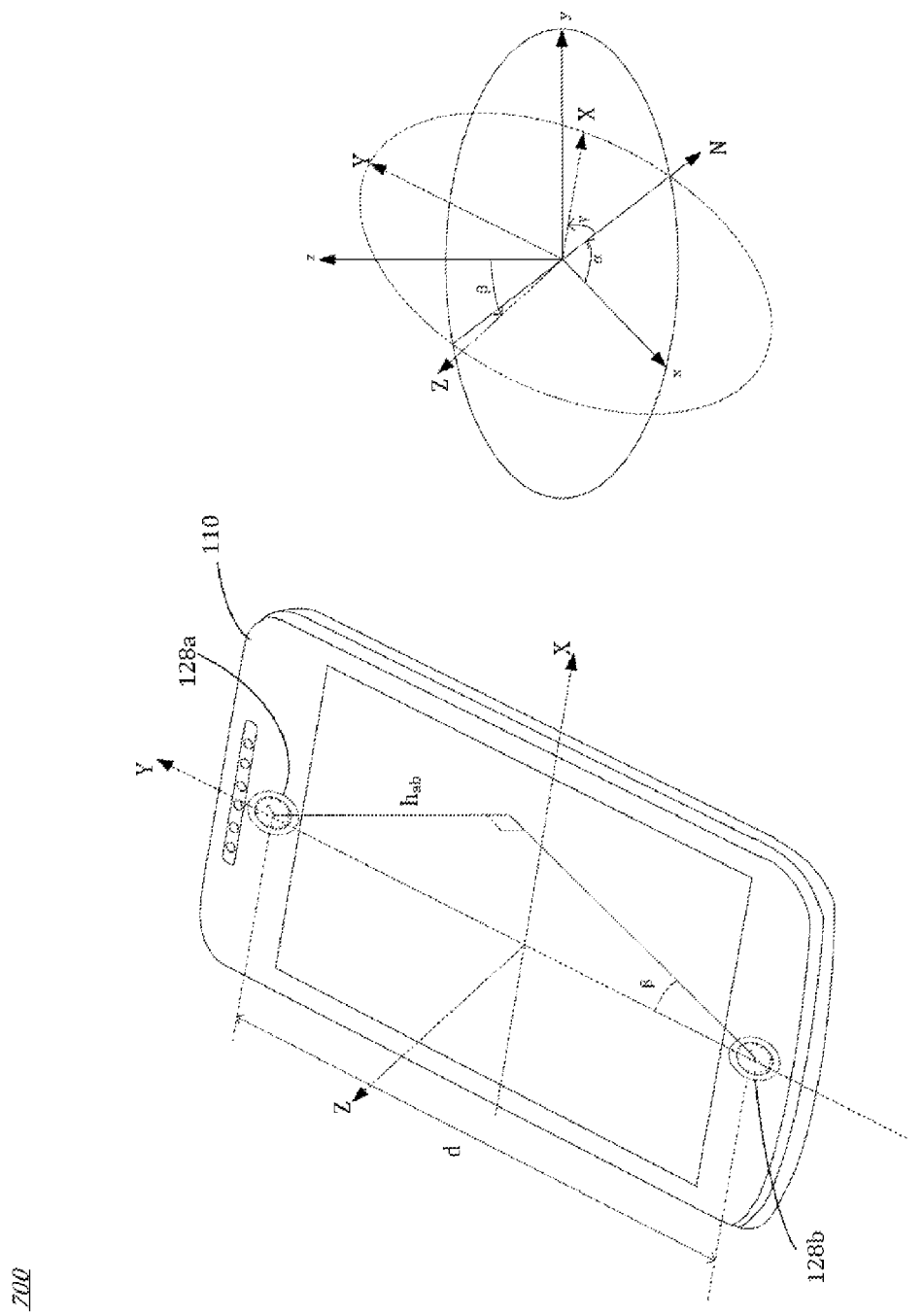
FIG. 7 is a perspective view of the mobile device of FIG. 4.

FIGS. 4 and 5 are plan views of the mobile device in a standing vertical position and a standing horizontal position, respectively, relative to a surface 300. FIG. 6 is a side view of the mobile device 110 in a lying position relative to the surface 300. FIG. 7 is a front perspective view of the mobile device 110.

With reference to FIG. 7, the two pressure sensors 128a-b may be mounted generally along or in parallel to a longitudinal axis of the mobile device 110. Thus, when the mobile device 110 is in the standing vertical position as shown in FIG. 4, the two pressure sensors 128a-b are generally aligned with the direction of gravity, and separated by a known distance d.

In an alternate embodiment as illustrated in FIGS. 8-11, the mobile device 110 may include three (or more) pressure sensors 128a-c. The pressure sensors 128a-c may be arranged in a non-collinear manner.

Figure 9:
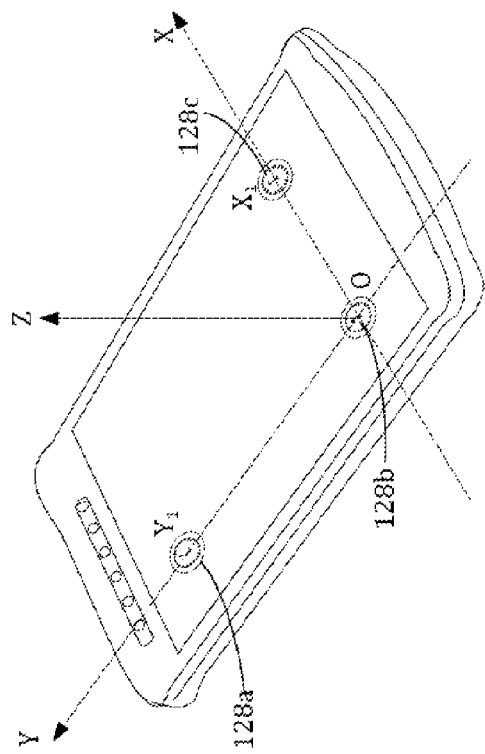
FIG. 9 is a perspective view of the mobile device of FIG. 8.
Figure 8:
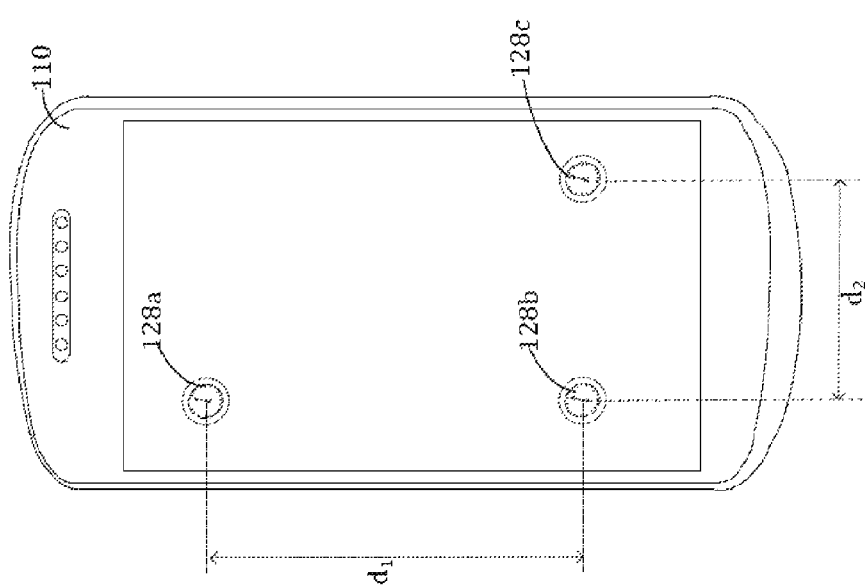
FIG. 8 is a plan view of the mobile device with three pressure sensors.
Figure 10:
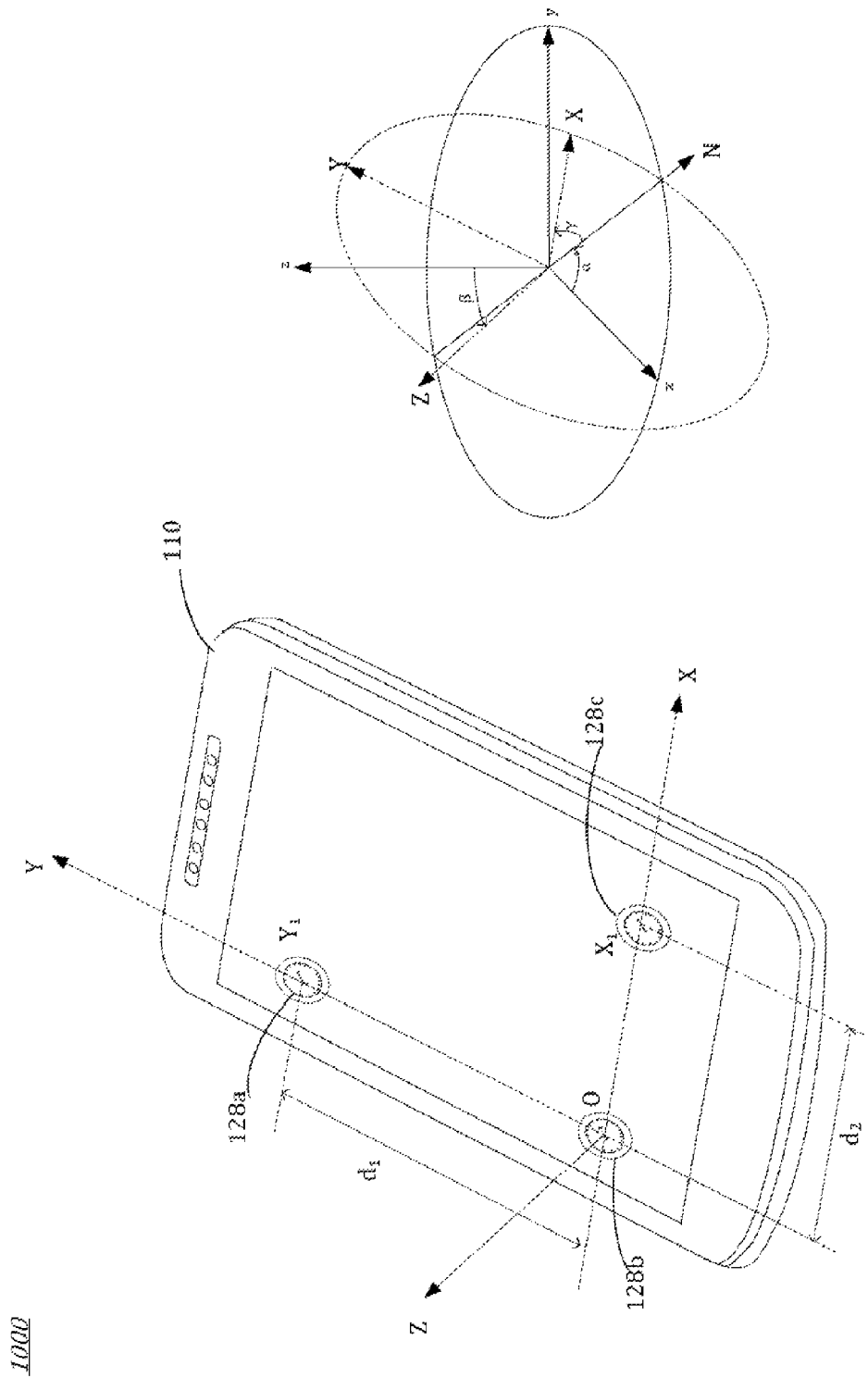
FIG. 10 is another perspective view of the mobile device of FIG. 8 with the three pressure sensors arranged according to one aspect of the disclosure.

As illustrated in FIGS. 9-10, the local frame of the mobile device 110 may be defined by an X-axis extending in a lateral direction of the mobile device 110, a Y-axis extending in a longitudinal direction of the mobile device 110, and a Z-axis extending in a direction normal to the face of the mobile device 110. In this example, the three pressure sensors 120 may be arranged in a manner such that a first pressure sensor 128a is on the Y-axis at point $Y_1$, a second pressure sensor 128b is at an origin O, and a third pressure sensor 128c is on the X-axis at point $X_1$. The first and second pressure sensors 128a-b may be separated by a known distance $d_1$, and the second and third pressure sensors 128b-c may be separated by a known distance $d_2$, which may be the same as or different than the distance $d_1$.

Figure 11:
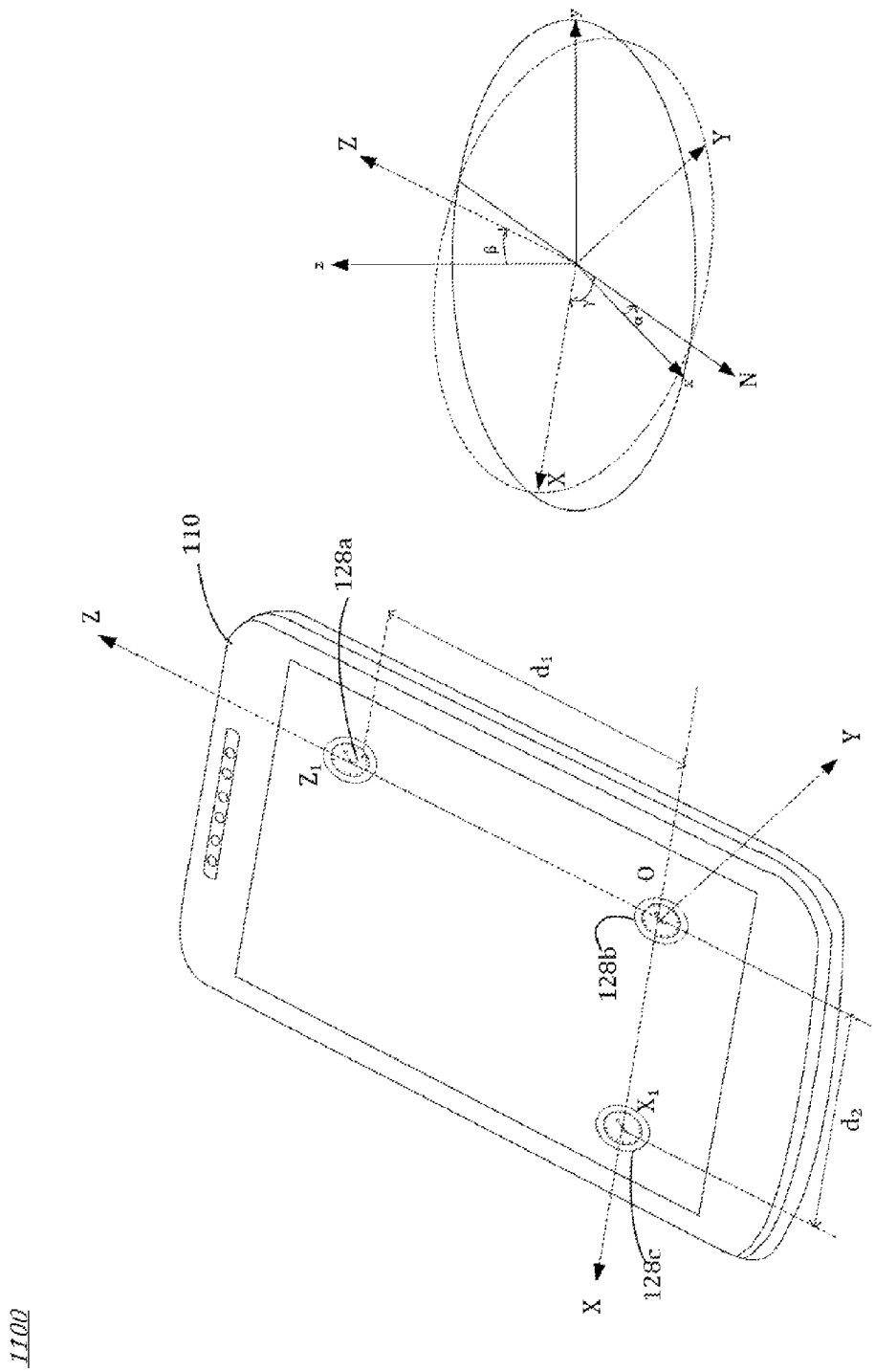
FIG. 11 is yet another perspective view of the mobile device of FIG. 8 with the three pressure sensors arranged according to another aspect of the disclosure.

In another example as illustrated in FIG. 11, the local frame of reference for the mobile device may be different from that illustrated in FIG. 10. Here, the X-axis may extend in the lateral direction, the Y-axis may extend in the direction normal to the face of the mobile device, and the Z-axis may extend in the longitudinal direction of the mobile device 110. In this example, the three pressure sensors 120 may be arranged in a manner such that the first pressure sensor 128a is on the Z-axis at point $Z_1$, the second pressure sensor 128b is at the origin O, and the third pressure sensor 128c is on the X-axis at point $X_1$. The pressure sensors may be separated by known distances $d_1$ and $d_2$ as shown.

2.6 Variation of Components

The components of the mobile device 110 discussed with reference to FIGS. 3-11 are merely illustrative, and are not intended to be limiting. One or more of the components may be combined.

In some examples, additional functional or physical components may be added to the example illustrated in FIG. 3. For instance, the mobile device 110 may include a geographic position component, e.g., a global positioning system (GPS) transceiver, a gyroscope, an accelerometer, a compass, a pedometer, and a magnetic field detector, among other possibilities. The accelerometer may measure the acceleration of gravity of the mobile device 110. The gyroscope may output readings to facilitate a determination of an orientation of the mobile device 110. The mobile device 110 may use data from the gyroscope and input from the accelerometer to determine the mobile device's pitch, yaw or roll relative to a direction of gravity. The mobile device 110 may use the compass to estimate the mobile device's orientation. The mobile device 110 may use the pedometer to gauge the approximate distance travelled on foot by registering the number of steps taken.

One or more components of the mobile device 110 may be physically separate from the mobile device 110 or physically distant from the remaining components.

3. EXAMPLE LOGIC AND METHODS OF OPERATION

As described earlier, the mobile device 110 may include an orientation analyzer to determine the orientation of the mobile device 110 by analyzing readings collected by the pressure sensors. The orientation analyzer may be implemented by ASICs, FPGAs, DSPs, integrated circuits, modules, computer-readable instructions, firmware, or a combination thereof, among other possibilities. Furthermore, the orientation analyzer may be implemented in a signal bearing non-transitory computer-readable storage medium in a variety of forms.

Figure 12:
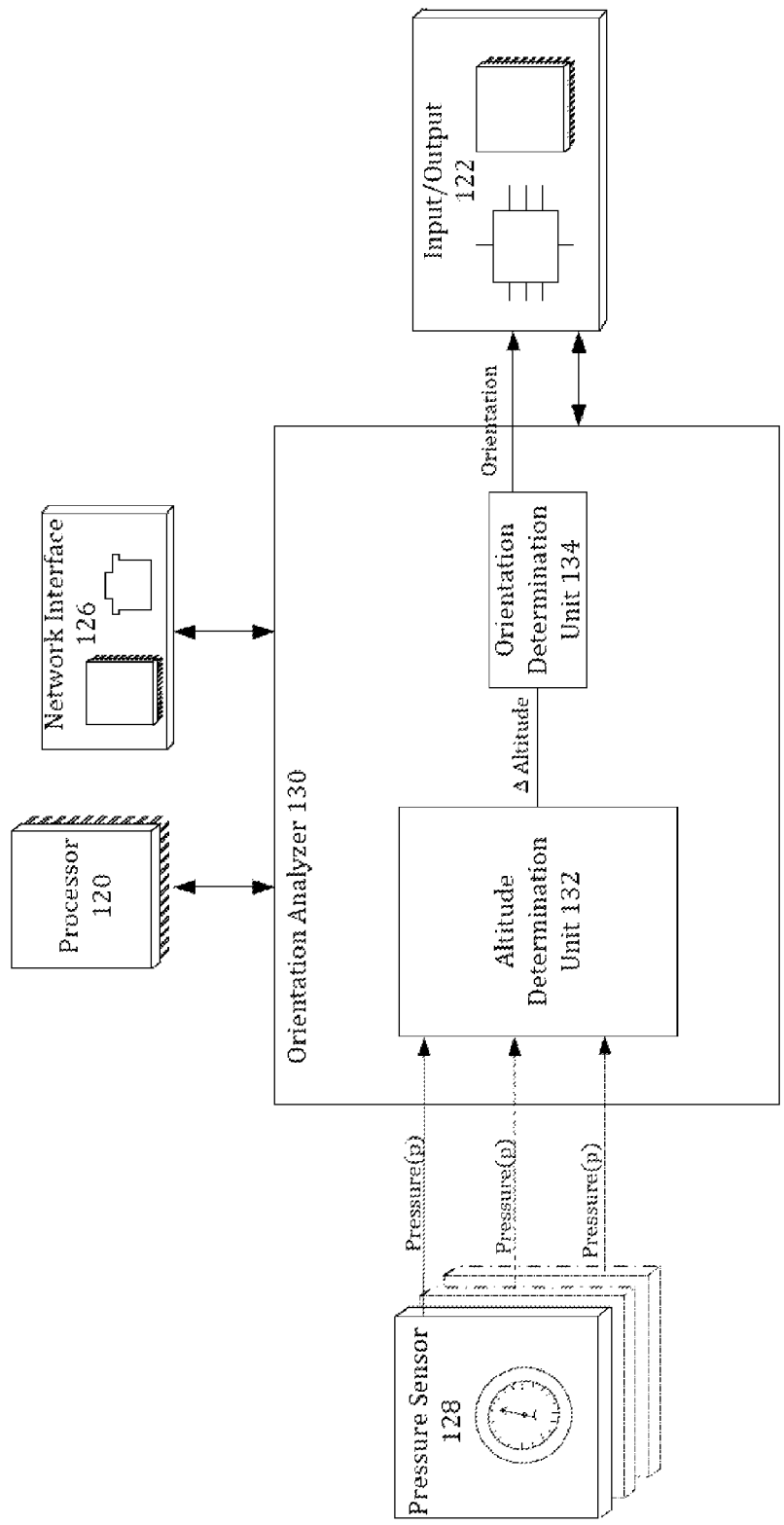
FIG. 12 is a block diagram of an example implementation of an orientation analyzer implemented in the mobile device.

FIG. 12 shows an example of the mobile device 110 that implements orientation analyzer 130. As shown in FIG. 12, the orientation analyzer 130 may include one or both of an altitude determination unit 132 and an orientation determination unit 134.

Example methods of operation performed by the orientation analyzer 130 and its individual units 132-134 are discussed in connection with the flow charts illustrated in FIGS. 13-15. Methods illustrated in one or more of the flow charts may be executed by a processor, e.g., the processor 120. In some examples, methods illustrated in each flow chart may be carried out periodically, continuously, as needed, as triggered, or in another manner.

As shown in the flow charts, each method may include one or more operations, functions, or actions as illustrated by one or more of the blocks. A block may represent a process of information, a transmission of information, or a combination thereof.

The flow charts discussed below are merely illustrative and are not intended to be limiting. For instance, although the blocks are illustrated in a sequential order, these blocks may also be performed in parallel or in a different order than those described herein, depending on the functionalities involved. Also, the various blocks may be combined into fewer blocks, divided into additional blocks, or omitted based upon the desired implementation. Furthermore, blocks illustrated in various flow charts may be combined with one another, in part or in whole, based on the functionalities involved.

Figure 13:
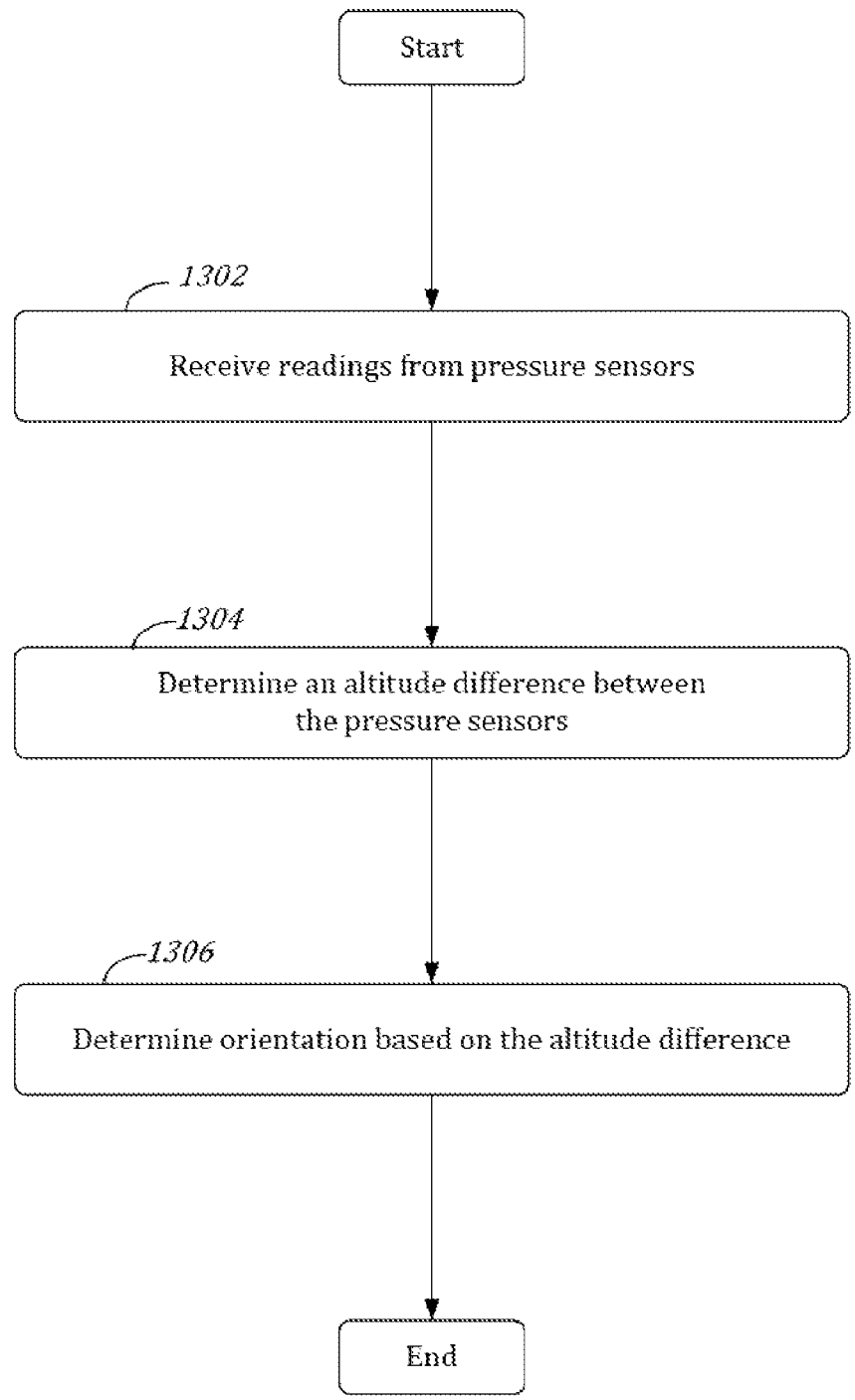
FIG. 13 is a flow chart of an overall process performed by the orientation analyzer, according to aspects of the disclosure.

FIG. 13 is a flow chart that illustrates an embodiment of an overall method of operation of the orientation analyzer 130. At block 1302, the altitude determination unit 132 receives or otherwise obtains observed empirical data, for instance from one or more pressure sensors 128. The data may include a raw pressure reading.

At block 1304, the altitude determination unit 132 determines an altitude difference between the pressure sensors 128. At block 1306, the orientation determination unit 134 determines an orientation of the mobile device 110 based on the determined altitude difference. Details regarding each unit of the orientation analyze 130 are provided below.

3.1 Altitude Determination Unit

The altitude determination unit 132 may receive a raw pressure reading, e.g., an atmospheric pressure reading p, from each pressure sensor 128 at substantially simultaneous points in time. The unit 132 may calculate an altitude h of each pressure sensor 128 based on its atmospheric pressure reading. Generally, the relationship between the atmospheric pressure and the altitude is governed by the following equation:

$$p = p_0 \cdot \left(1 - \frac{L \cdot h}{T_0}\right)^{\frac{g \cdot M}{R \cdot L}} \quad (1)$$

where h is the altitude, p is the atmospheric pressure, and parameters $p_0$, L, $T_0$, g, M, and R are constants described in Table 1 below.

TABLE 1

| Parameter | Description | Value |
|---|---|---|
| $p_0$ | sea level standard atmospheric pressure | 101325 Pa |
| L | temperature lapse rate | 0.0065 K/m |
| $T_0$ | sea level standard temperature | 288.15 K |
| g | Earth-surface gravitational acceleration | 9.80665 m/s² |
| M | molar mass of dry air | 0.0289644 kg/mol |
| R | universal gas constant | 8.31447 J/(mol · K) |

Based on equation (1), the relationship between the atmospheric pressure p and the altitude (h) may be approximated as follows:

$$p \approx p_0 \cdot e^{-\frac{g \cdot M \cdot h}{R \cdot T_0}} \quad (2)$$

where the parameter L that appears in equation (1) has been eliminated.

Based on equation (2), for any given pressure p, its corresponding altitude h may be derived as follows:

$$h = -\frac{R \cdot T_0}{g \cdot M} \log \frac{p}{p_0} \quad (3)$$

Following equation (3), the altitude determination unit 132 may determine the altitude of each pressure sensor 128 based on its pressure reading. By way of example, with regard to FIGS. 4-6, the altitude determination unit 132 may receive a pressure reading $p_a$ from the pressure sensor 128a. The unit 132 may estimate the altitude $h_a$ of the pressure sensor 128a as follows:

$$h_a = -\frac{R \cdot T_0}{g \cdot M} \log \frac{p_a}{p_0} \quad (4)$$

Similarly, based on a pressure reading $p_b$ from the pressure sensor 128b, the unit 132 may estimate the altitude $h_b$ of the pressure sensor 128b as follows:

$$h_b = -\frac{R \cdot T_0}{g \cdot M} \log \frac{p_b}{p_0} \quad (5)$$

Based on equations (4) and (5), the unit 132 may determine a difference $h_{ab}$ between the altitudes of the two pressure sensors 128a-b as follows:

$$h_{ab} = h_a - h_b \quad (6)$$
$$= -\frac{R \cdot T_0}{g \cdot M} \log \frac{p_a}{p_0} - \left(-\frac{R \cdot T_0}{g \cdot M} \log \frac{p_b}{p_0}\right)$$
$$= -\frac{R \cdot T_0}{g \cdot M} \left(\log \frac{p_a}{p_0} - \log \frac{p_b}{p_0}\right)$$
$$= -\frac{R \cdot T_0}{g \cdot M} \log \frac{p_a}{p_b}$$

where the parameter $p_0$ has been eliminated.

Setting $$\tau = -\frac{R \cdot T_0}{g \cdot M},$$

equation (6) may be further simplified as follows:

$$h_{ab} = \tau \log \frac{p_a}{p_b} \quad (7)$$

In equation (7), the constant τ may remain mostly at a fixed constant value independent of changes in the environment, such as changes in terms of the location or height. Nevertheless, to achieve a higher degree of precision, τ may be fine-tuned to a local best value specific to each individual locations. Such locations may be coarse locations estimated using the GPS.

Based on equation (7), the altitude determination unit 132 is configured to calculate the altitude difference $h_{ab}$, once the pressure readings $p_a$ and $p_b$ have been obtained.

Furthermore, $$\log\frac{p_a}{p_b}$$

in equation (7) may be approximated as follows:

$$\log\frac{p_a}{p_b} = \log\left(\frac{p_b + \Delta p_{ab}}{p_b}\right) = \log\left(1 + \frac{\Delta p_{ab}}{p_b}\right) \approx \frac{\Delta p_{ab}}{p_b} \quad (8)$$

where $\Delta p_{ab}$ represents the pressure difference between $p_a$ and $p_b$.

In some embodiments, the pressure reading detected by any given pressure sensor may be generally about the sea level standard atmospheric pressure $p_0$, which is 101325 Pa. As the mobile device 110 moves from one location to another, the pressure reading obtained from each pressure sensor may change from the sea standard atmospheric pressure $p_0$ by a small percentage. Accordingly, $p_b$ in equation (8) may be approximated by $p_0$, and $$\log\frac{p_a}{p_b}$$

in equation (8) may be approximated by $$\frac{\Delta p_{ab}}{p_0}.$$

Based on the foregoing, equation (7) may be further approximated as follows:

$$h_{ab} = \tau\log\frac{p_a}{p_b} \approx \tau\frac{\Delta p_{ab}}{p_0} \quad (9)$$

As an alternative to equation (7), the altitude determination unit 132 may estimate the altitude difference $h_{ab}$ according to equation (9), which relies on a pressure difference $\Delta p_{ab}$ between two points or two pressure sensors on a mobile device 110, irrespective of the absolute reading or the absolute pressure measurement by each pressure sensor.

Equations (7) and (9) discussed above may be used to calculate an altitude difference between any two pressure sensors. For instance, with regard to the example of three pressure sensors illustrated in FIGS. 10-11, the pressure readings obtained from the pressure sensors 128a, 128b and 128c may be $p_a$, $p_b$, and $p_c$ respectively. The altitude difference between the pressure sensors 128a and 128b may be derived according to either equation (7) or (9). The altitude difference $h_{cb}$ between the pressure sensors 128b and 128c may be derived by analogy as follows:

$$h_{cb} = \tau\log\frac{p_c}{p_b} \quad (10)$$

$$h_{cb} = \tau\log\frac{p_c}{p_b} \approx \tau\frac{\Delta p_{cb}}{p_0} \quad (11)$$

or where $\Delta p_{cb}$ represents the pressure difference between $p_b$ and $p_c$.

Once the altitude determination unit 132 determines the altitude difference(s), it may output the altitude difference(s) to the orientation determination unit 134.

3.2 Orientation Determination Unit

The orientation determination unit 134 is configured to determine the orientation of the mobile device 110 based on the altitude difference(s) provided by the altitude determination unit 132. Different processes may be implemented based on the number of pressure sensors 128. FIGS. 14-15 illustrate flow charts of example processes used to determine the orientation of the mobile device 110 based on two pressure sensors and three pressure sensors, respectively. Detailed description of each process is as follows.

3.2.1 Two Pressure Sensors

Figure 14:
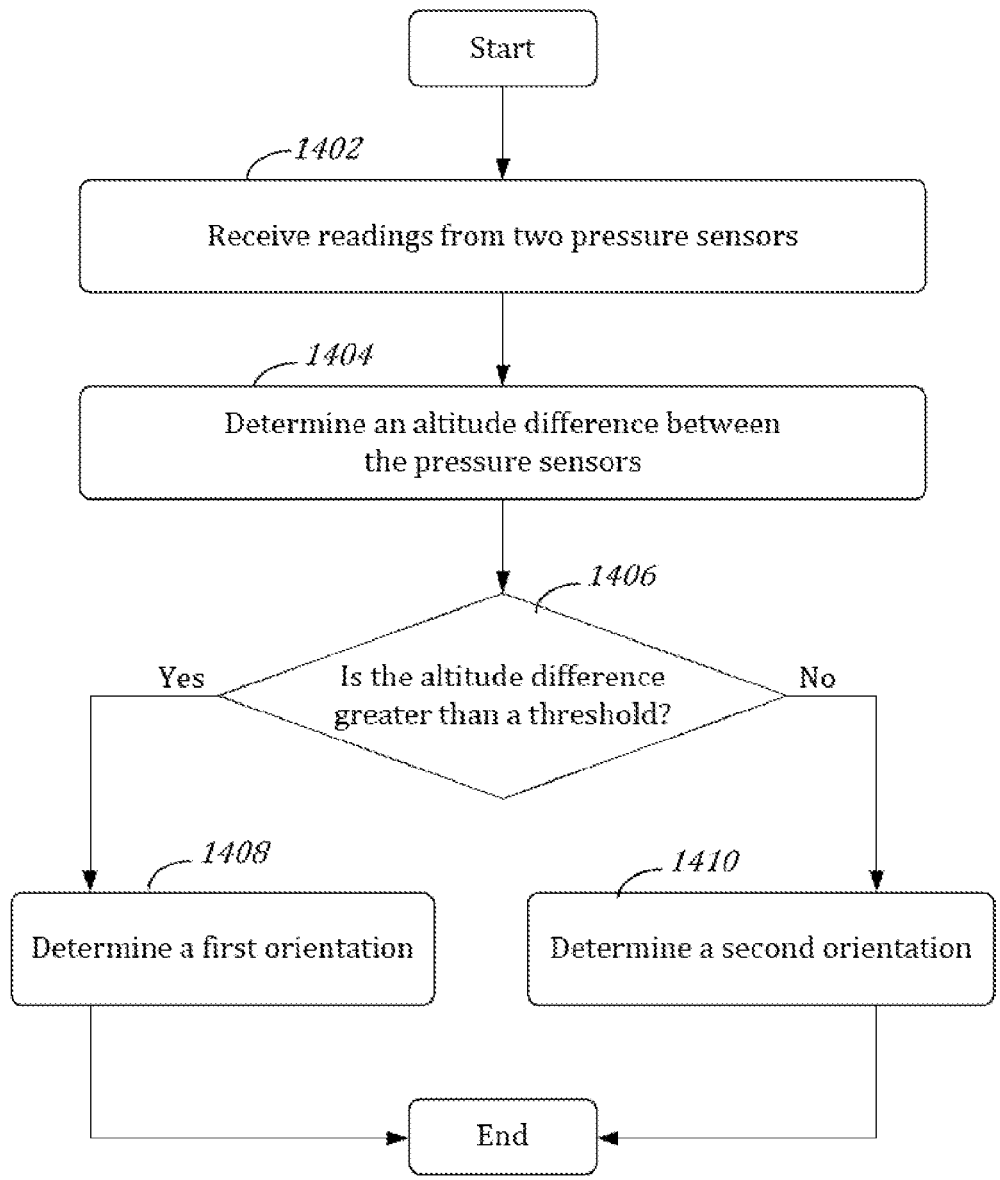
FIG. 14 is a flow chart of a process performed by the orientation analyzer based on two pressure sensors, according to aspects of the disclosure.

With reference to FIG. 14, at blocks 1402-1404, the altitude determination unit 132 may receive or otherwise obtain readings $p_a$, and $p_b$ from two pressure sensors 128a and 128b at substantially simultaneous points in time, and determine an altitude difference $h_{ab}$ between the pressure sensors 128a and 128b according to equation (7) or equation (9) discussed above.

At block 1406, the orientation determination unit 134 compares the altitude difference $h_{ab}$ to a threshold value. The threshold value may represent a division between a first orientation and a second orientation. If the altitude difference $h_{ab}$ is greater than the threshold value, at block 1408, the unit 134 determines that the mobile device 110 is at the first orientation. Otherwise, at block 1410, the unit 134 determines that the mobile device 110 is at the second orientation.

With reference to FIGS. 4-6, the altitude difference $h_{ab}$ varies as the mobile device 110 moves between a standing vertical position shown in FIG. 4 and a standing horizontal position shown in FIG. 5, or as the mobile device 110 moves between the standing vertical position and a lying position shown in FIG. 6. The altitude difference $h_{ab}$ is at its maximum when the mobile device 110 is at the standing vertical position, and is at its minimum when the mobile vide 110 is at the standing horizontal position or at the lying position.

In one example, the threshold value may be about one half of the distance d between the two pressure sensors 128a and 128b. When the altitude difference $h_{ab}$ is greater than the threshold value, the mobile device 110 may be considered approximately at the standing vertical position. When the altitude difference $h_{ab}$ is less than or equal to the threshold value, the mobile device 110 may be considered approximately at the standing horizontal position or at the lying position.

In another example, the unit 134 may use two threshold values. A first threshold may be set to a value approximating the distance d between the two pressure sensors 128a and 128b, and a second threshold may be set approximately at zero. When the altitude difference $h_{ab}$ reaches the first threshold, the unit 134 may determine that the mobile device 110 is at the standing vertical position. When the altitude difference $h_{ab}$ drops to the second threshold, the unit 134 may determine that the mobile device is at the standing horizontal position or the lying position.

In yet another example, the unit 134 may determine the orientation of the mobile device 110 by calculating an Euler angle β between the Z-axis of the local frame of the mobile device 110 and the z-axis of the reference frame. The Euler angle β may be calculated according to the following equation:

$$\beta = \cos^{-1}\left(\frac{h_{ab}}{d}\right) \tag{12}$$

When β is approximately 0°, the mobile device 110 may be in the standing horizontal position as illustrated in FIG. 5 or in the lying position illustrated in FIG. 6. When β is approximately 90°, the mobile device 110 may be in the standing vertical position.

Once the orientation determination unit 134 determines the orientation of the mobile device 110, the unit 134 may output the result to the input/output device 122. Alternatively, the mobile device 110 may rely on the determined orientation to take further actions, such as executing other related applications.

3.2.2 Three Pressure Sensors

Figure 15:
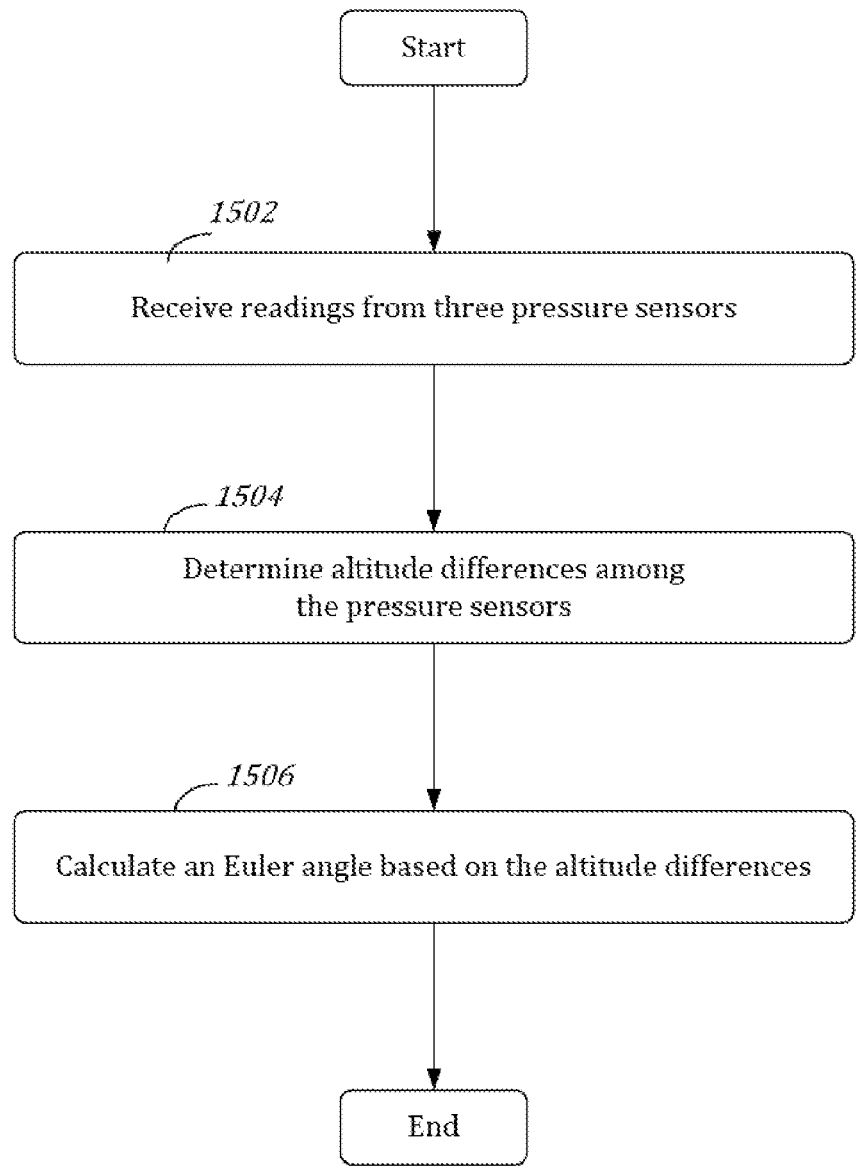
FIG. 15 is a flow chart of a process performed by the orientation analyzer based on three pressure sensors, according to aspects of the disclosure.

FIG. 15 illustrates a flow chart of a process to determine the orientation of the mobile device 110 based on three pressure sensors 128*a-c*. At blocks 1502-1504, the altitude determination unit 132 may receive readings $p_a$, $p_b$ and $p_c$ from three respective pressure sensors 128*a*, 128*b*, and 128*c* simultaneously. The unit 132 may determine the altitude difference $h_{ab}$ between the pressure sensors 128*a* and 128*b* according to equation (7) or equation (9) discussed above, and determine the altitude difference $h_{cb}$ between the pressure sensors 128*c* and 128*b* according to equation (10) or equation (11).

At block 1506, the orientation determination unit 134 may calculate one or more Euler angles based on the altitude differences $h_{ab}$ and $h_{ab}$. The unit 134 may determine the Euler angle based on the positions of the pressure sensors relative to the local frame of the mobile device 110.

Referring back to FIGS. 10 and 11 that illustrate two definitions of the local frame of the mobile device 110, the respective positions of the three sensors in each local frame may differ. The unit 134 may perform different geometry steps in each scenario to determine the orientation of the mobile device 110.

3.2.2.1 First Scenario

Figure 16:
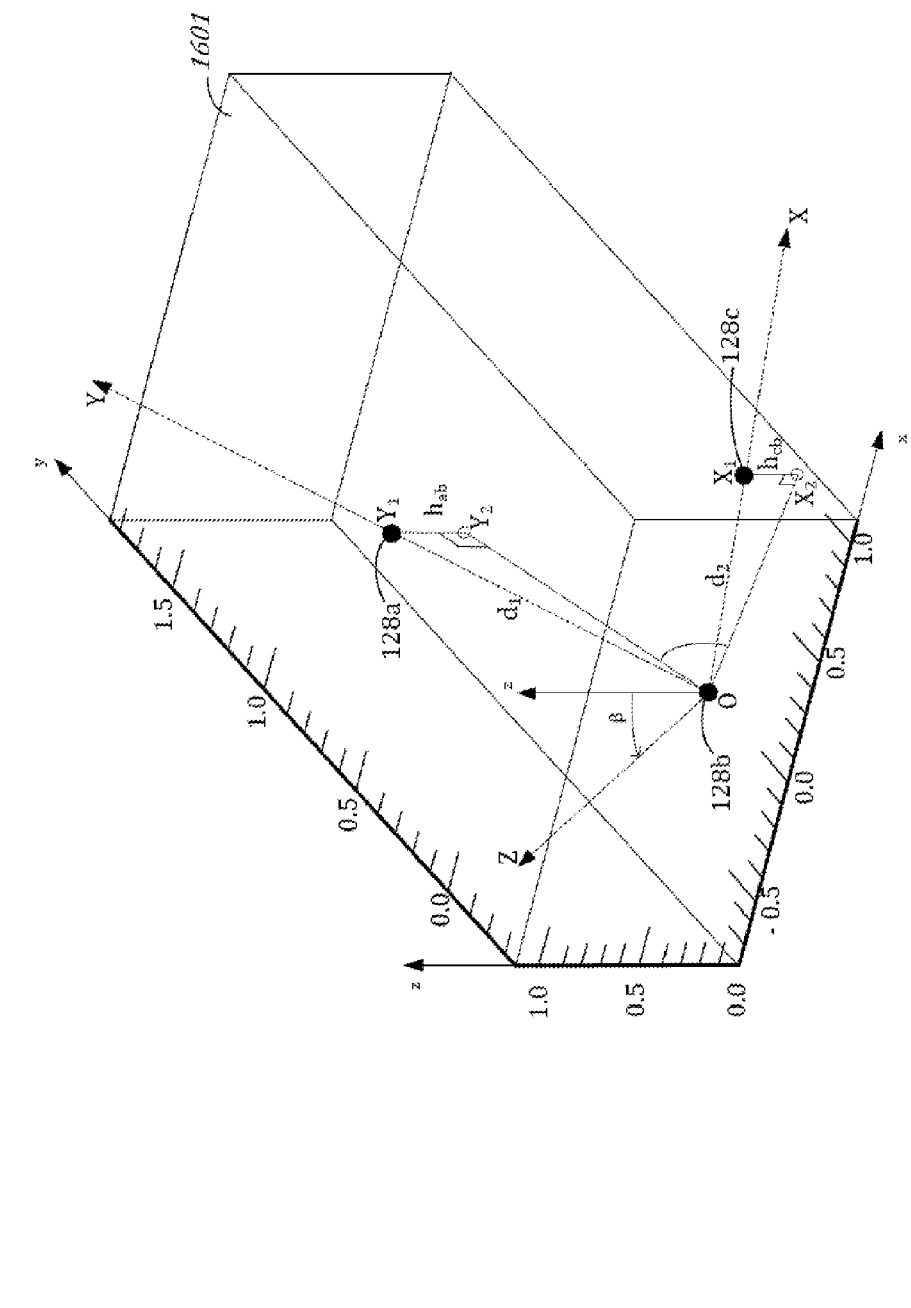
FIG. 16 is a schematic drawing of a local frame of the mobile device relative to a reference frame according to one aspect of the disclosure.

With regard to the scenario of FIG. 10, FIG. 16 reproduces the local frame (X, Y, Z) of FIG. 10, and also reproduces the positions $Y_1$, O, and $X_1$ of the pressure sensors 128*a*, 128*b*, and 128*c* as illustrated in FIG. 10. In FIG. 16, the box 1601 may represent the reference frame (x, y, z).

In FIG. 16, the distance $OX_1$ between the point $X_1$, where the pressure sensor 128*c* is disposed, and the origin O, where the pressure sensor 128*b* is disposed, is $d_2$. The distance $OY_1$ between the point $Y_1$, where the pressure sensor 128*a* is disposed, and the origin O, where the pressure sensor 128*b* is disposed, is $d_1$.

In FIG. 16, the point $X_2$ represents the projection of $X_1$ on the x-y plane of the reference frame. Similarly, the point $Y_2$ represents the projection of $Y_1$ on the x-y plane of the reference frame.

The distance $Y_{12}$ between the points $Y_1$ and $Y_2$ is equivalent to the altitude difference $h_{ab}$ between the pressure sensors 128*a* and 128*b*. Similarly, the distance $X_{12}$ between the points X1 and X2 is equivalent to the altitude difference $h_{cb}$ between the pressure sensors 128*c* and 128*b*.

Referring to FIG. 16, a distance between the origin O and the projection $X_2$ may be calculated as follows:

$$OX_2 = \sqrt{OX_1^2 - Y_1Y_2^2} = \sqrt{d_2^2 - h_{cb}^2} \tag{13}$$

Similarly, a distance between the origin O and the projection $Y_2$ may be calculated as follows:

$$OX_2 = \sqrt{OX_1^2 - Y_1Y_2^2} = \sqrt{d_1^2 - h_{ab}^2} \tag{14}$$

A distance between the projections $X_2$ and $Y_2$ may be calculated as follows:

$$\begin{aligned}X_2Y_2 &= \sqrt{OX_1^2 + OY_1^2 - (Y_1Y_2 - X_1X_2)^2} \\ &= \sqrt{d_2^2 + d_1^2 - (h_{ab} - h_{cb})^2}\end{aligned} \tag{15}$$

By law of cosines, an angle $\angle Y_2OX_2$ formed between $OY_2$ and $OX_2$ may be calculated as follows:

$$\angle Y_2OX_2 = \cos^{-1}\left(\frac{OX_2^2 + OY_2^2 - X_2Y_2^2}{2 \cdot OX_2 \cdot OY_2}\right) \tag{16}$$

Based on the foregoing, the unit 134 may determine the coordinates of each of the points $X_1$, $X_2$, $Y_1$, and $Y_2$ in the reference frame as follows:

$Y_2 = \{OY_2 \cdot \cos(\angle Y_2OX_2), OY_2 \cdot \sin(\angle Y_2OX_2), 0\}$ $Y_1 = Y_2 + \{0, 0, h_{ab}\}$ $X_2 = \{OX_2, 0, 0\}$ $X_1 = X_2 + \{0, 0, h_{cb}\}$ The unit 134 may calculate the Euler angle β between the z-axis of the reference frame and the Z-axis of the local frame according to the following equation:

$$\beta = \cos^{-1}\left(\sqrt{-\frac{h_{cb}^2}{d_2^2} - \frac{h_{ab}^2}{d_1^2} + 1}\right) \tag{17}$$

In equation (17), the altitude differences $h_{cb}$ and $h_{ab}$ are determined by the altitude determination unit 132, and the separation distances $d_2$ and $d_1$ among the pressure sensors may be predetermined or known in advance. The orientation determination unit 134 may substitute the respective values of $h_{cb}$, $h_{ab}$, $d_2$ and $d_1$ into equation (17) to calculate the Euler angle β.

3.2.2.1 Second Scenario

Figure 17:
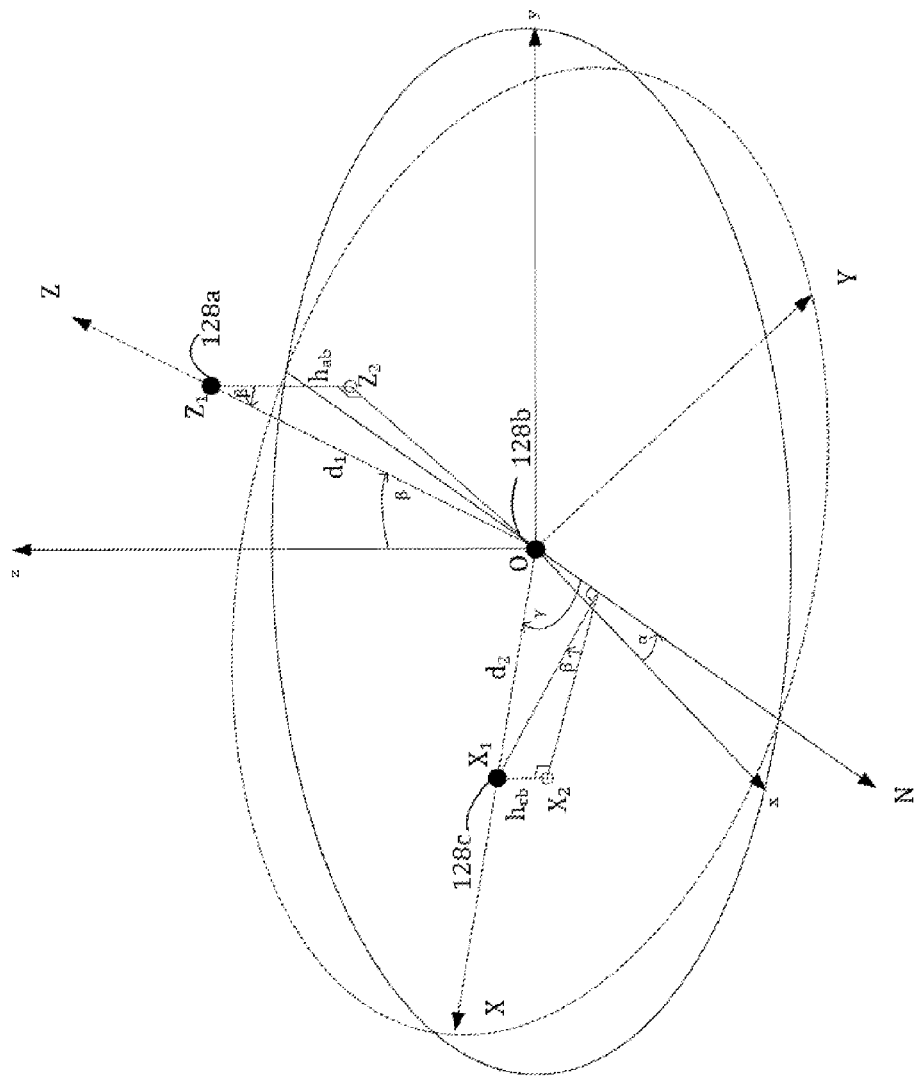
FIG. 17 is a schematic drawing of the local frame of the mobile device relative to the reference frame according to another aspect of the disclosure.

With regard to the scenario of FIG. 11, FIG. 17 reproduces the local frame (X, Y, Z) of FIG. 11, and also reproduces the positions $Z_1$, O, and $X_1$ of the pressure sensors 128*a*, 128*b*, and 128*c* illustrated in FIG. 11.

With continued reference to FIG. 17, the distance $OX_1$ between the point $X_1$ where the pressure sensor 128c is located and the origin O where the pressure sensor 128b is located is $d_2$. The distance $OZ_1$ between the point $Z_1$ where the pressure sensor 128a is located and the origin O where the pressure sensor 128b is located is $d_1$.

In FIG. 17, the point $X_2$ represents the projection of $X_1$ on the x-y plane of the reference frame. Similarly, the point $Z_2$ represents the projection of $Z_1$ on the x-y plane of the reference frame.

The distance $Z_{12}$ between the points $Z_1$ and $Z_2$ is equivalent to the altitude difference $h_{ab}$ between the pressure sensors 128a and 128b. Similarly, the distance $X_{12}$ between the points $X_1$ and $X_2$ is equivalent to the altitude difference $h_{cb}$ between the pressure sensors 128c and 128b.

Referring to FIG. 17, a relationship between the Euler angle β and the distance $Z_{12}$ may be found as follows:

$$OZ_1 \cdot \cos(\beta) = Z_{12} \qquad (18)$$

Accordingly, the orientation determination unit 134 may determine the Euler angle β according to the following equation:

$$\beta = \cos^{-1}\left(\frac{Z_{12}}{OZ_1}\right) = \cos^{-1}\left(\frac{h_{ab}}{d_1}\right) \qquad (19)$$

Further, a relation between the Euler angles β and γ may be found as follows:

$$OX_1 \cdot \sin(\gamma) \cdot \sin(\beta) = X_1 X_2 \qquad (20)$$

Once the Euler angle β is established according to equation (19), the orientation determination unit 134 may determine the Euler angle γ as follows:

$$\gamma = \sin^{-1}\left(\frac{X_1 X_2}{OX_1 \cdot \sin(\beta)}\right) = \sin^{-1}\left(\frac{h_{cb}}{d_2 \cdot \sin(\beta)}\right) \qquad (21)$$

In the formulas (19) and (21), the altitude differences $h_{cb}$ and $h_{ab}$ are determined by the altitude determination unit 132, and the separation distances $d_2$ and $d_1$ among the pressure sensors may be predetermined or otherwise known in advance. The orientation determination unit 134 may substitute the respective values of $h_{ab}$ and $d_1$ into the formula (19) to calculate the Euler angle β. Subsequently, the unit 134 may substitute the respective values of $h_{ab}$, $d_1$, and the calculated Euler angle β in to the formula (21) to calculate the Euler angle γ.

4. OTHER IMPLEMENTATIONS

The implementation of the orientation analyzer 130 described above with respect to the units 132-134, and the processes described therein, are merely illustrative and are not meant to be limiting. The orientation analyzer 130 may include other units or variations thereof. For instance, one or both of units 132 and 134 of the orientation analyzer 130 may be divided into additional units, or may be combined.

Alternatively, the orientation analyzer 130 may be implemented entirely in a server remotely connected to the mobile device 110 via a network. The mobile device 110 may provide readings obtained from the pressure sensors 128 to the server. After determining the orientation of the mobile device 110, the server may transmit the result to the mobile device 110. Alternatively, the server may take further actions, such as executing other related applications.

In some other examples, the orientation analyzer 130 may be implemented in part on the mobile device 110 and implemented in part on the server, such that the mobile device 110 and the server may jointly or collaboratively determine the orientation of the mobile device 110.

Further, in the three-sensor implementations discussed with respect to FIGS. 8-11, the pressure sensors may be arranged to form any non-collinear triangle or other arrangement. The orientation analyzer 130 may use the relation between altitude and pressure to interpolate pressure values.

Still further, the number of pressure sensors used in the drawings is merely exemplary. For instance, more than three pressure sensors may be used.

As discussed above, the pressure sensors 128 may be barometric pressure sensors. Alternatively, the pressure sensors 128 may be of other types that can measure altitude.

5. EXAMPLE USE SCENARIO

With pressure sensors of sufficiently high precision and low noise level, the technologies described above may provide an accurate determination of the orientation of mobile devices. Such determination may be used in many applications such as games. Further, by way of example, based on the determination of the orientation, the mobile device 110 may switch between a portrait view as illustrated in FIG. 4 and a landscape view as illustrated in FIG. 5.

Additionally, the methods, processes, and techniques described above may also be applied to navigation systems, including vehicles such as cars, trucks or busses, among other possibilities.

Figure 18:
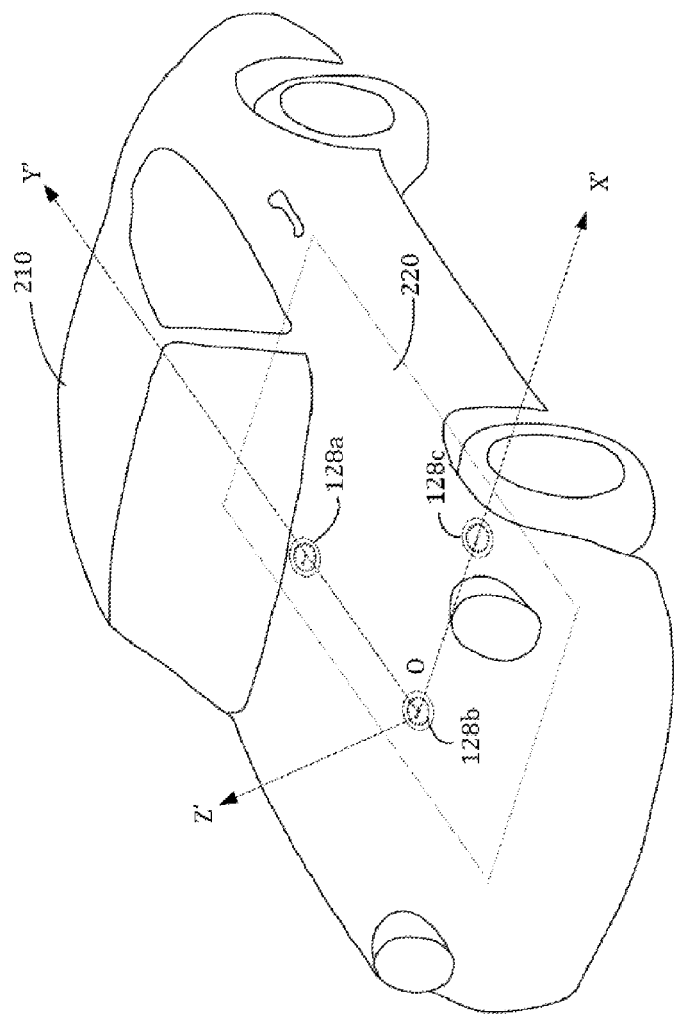
FIG. 18 is a schematic drawing of an example vehicle with three pressure sensors.

FIG. 18 provides one example of a vehicle 210 implemented with three pressure sensors. The orientation of the vehicle 210 may be determined based on readings collected from the pressure sensors according to the process of FIG. 15. Based on the determination of the vehicle 210, a system or operator may keep track of the turning, acceleration, deceleration, position, and velocity of the car at any time.

Further, the orientation determination mechanisms discussed herein may be used to supplement existing technologies, providing a higher degree of accuracy than is possible with the use of any single technology. For instance, the orientation analyzer discussed here may supplement an inertial navigation system in mobile devices or vehicles to compute an accurate linear acceleration. By differentiating the orientation information, for example the Euler angles, the angular velocity of the mobile devices or vehicles may be derived.

6. CONCLUSION

Although aspects of the disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method of determining an orientation of a mobile device having a display, the method comprising:
   receiving readings from two pressure sensors mounted in the mobile device at substantially simultaneously the same time;

determining, by one or more processors, whether the difference in altitude between the two pressure sensors based on the received readings exceeds a threshold value;

determining that the mobile device is at a first angular orientation relative to the direction of gravity when the difference in altitude is above the threshold value;

determining that the mobile device is in a second orientation relative to the direction of gravity when the difference in altitude is below the threshold value, where the first angular orientation is closer to vertical than the second orientation relative to the direction of gravity; and in response to determining that the mobile device is in the second orientation, switching the display between a portrait view and landscape view.

2. The method of claim 1, wherein the two pressure sensors are barometric pressure sensors.

3. The method of claim 1, wherein the first orientation is a vertical position.

4. The method of claim 1, wherein the second orientation is a horizontal position.

5. A method of determining an orientation of a mobile device, comprising:

receiving readings from three pressure sensors mounted in the mobile device at substantially the same time;

determining, by a processor, differences in altitude among the three pressure sensors based on the received readings;

calculating an Euler angle based on the differences in altitude, the Euler angle representing a rotation of a frame of the mobile device from a reference frame;

determining the angular orientation of the mobile device using the Euler angle; and selecting a portrait view or landscape view for a display based on the determined angular orientation.

6. The method of claim 5, wherein the three pressure sensors are barometric pressure sensors.

7. The method of claim 5, wherein the three pressure sensors are mounted in the mobile device in a non-collinear manner.

8. The method of claim 5, wherein two of the three pressure sensors are mounted respectively on two axes of the frame of the mobile device, and a remaining pressure sensor is mounted at an origin of the frame of the mobile device.

9. An apparatus comprising:
a display;
two pressure sensors;
one or more processors in communication with the pressure sensors; and
memory storing instructions executable by the one or more processors, wherein the instructions comprise:
receiving readings from the two pressure sensors at substantially the same time;
determining whether the difference in altitude between the two pressure sensors based on the received readings exceed a threshold value;
determining that the apparatus is at a first angular orientation relative to the direction of gravity when the difference in altitude is above the threshold value;
determining that the apparatus is in a second orientation relative to the direction of gravity when the difference is below the threshold value, where the first angular orientation is closer to vertical than the second orientation relative to the direction of gravity;
displaying data in portrait view on the display when the apparatus is determined to be at a first angular orientation; and
displaying data in landscape view on the display when the apparatus is determined to be in a second angular orientation.

10. The apparatus of claim 9, wherein the two pressure sensors are barometric pressure sensors.

11. The apparatus of claim 9, wherein the apparatus is a mobile device.

12. The apparatus of claim 9, wherein the first orientation is a vertical position.

13. The apparatus of claim 9, wherein the second orientation is a horizontal position.

14. An apparatus comprising:
a housing;
a navigation system;
at least three pressure sensors coupled to the housing;
one or more processors in communication with each of the pressure sensors; and
memory storing instructions executable by the one or more processors, wherein the instructions comprise:
receiving readings from each of the pressure sensors at substantially the same time;
determining differences in altitude among the pressure sensors based on the received readings;
calculating an Euler angle based on the differences in altitude, the Euler angle representing a rotation of a frame of the apparatus from a reference frame; and
determining the angular orientation of the housing of the apparatus using the Euler angle;
tracking data representative of at least one of turning, deceleration, position or velocity of the apparatus based on the determined angular orientation; and
providing the tracked data to the navigation system.

15. The apparatus of claim 14, wherein the at least three pressure sensors are barometric pressure sensors.

16. The apparatus of claim 14, wherein the at least three pressure sensors are arranged in a non-collinear manner.

17. The apparatus of claim 14, wherein the apparatus is a mobile device.

18. The apparatus of claim 14, wherein the apparatus is a vehicle.

19. The apparatus of claim 14, wherein two of the at least three pressure sensors are mounted respectively on two axes of the frame of the apparatus, and a remaining pressure sensor is mounted at an origin of the frame of the apparatus.

* * * * *